United States Patent
Stulken et al.

(10) Patent No.: US 10,852,934 B2
(45) Date of Patent: Dec. 1, 2020

(54) LATENCY COMPENSATION IN COUPLED PROCESSOR SYSTEMS

(71) Applicant: The Boeing Company, Chicago, IL (US)

(72) Inventors: David E. Stulken, Cedar Rapids, IA (US); Peter J. Batsakes, Seattle, WA (US)

(73) Assignee: The Boeing Company, Chicago, IL (US)

( * ) Notice: Subject to any disclaimer, the term of this patent is extended or adjusted under 35 U.S.C. 154(b) by 214 days.

(21) Appl. No.: 15/850,337

(22) Filed: Dec. 21, 2017

(65) Prior Publication Data
US 2019/0196686 A1    Jun. 27, 2019

(51) Int. Cl.
| | | |
|---|---|---|
| G06F 3/0488 | (2013.01) | |
| G06F 9/451 | (2018.01) | |
| G06F 3/14 | (2006.01) | |
| G06F 3/0481 | (2013.01) | |
| B60R 16/023 | (2006.01) | |

(52) U.S. Cl.
CPC .......... *G06F 3/0488* (2013.01); *B60R 16/023* (2013.01); *G06F 3/04812* (2013.01); *G06F 3/1454* (2013.01); *G06F 9/452* (2018.02)

(58) Field of Classification Search
CPC ...... G06F 3/0488; G06F 3/1454; G06F 9/452; G06F 3/04812; B60R 16/023; G08B 5/22; B64D 43/00
See application file for complete search history.

(56) References Cited

U.S. PATENT DOCUMENTS

| | | | | |
|---|---|---|---|---|
| 2012/0092277 | A1* | 4/2012 | Momchilov | G06F 3/038 345/173 |
| 2014/0297674 | A1* | 10/2014 | Rhee | G06F 3/167 707/758 |
| 2016/0357495 | A1* | 12/2016 | Moorjani | G06F 3/1454 |
| 2017/0017455 | A1* | 1/2017 | Shimohira | G06F 3/1454 |

OTHER PUBLICATIONS

European Patent Office, Extended European Search Report regarding European Patent Application No. 18209041.5-1224, dated May 23, 2019, 9 pages.

* cited by examiner

*Primary Examiner* — Tadesse Hailu
*Assistant Examiner* — Roberto Borja
(74) *Attorney, Agent, or Firm* — Kolisch Hartwell, P.C.

(57) ABSTRACT

Systems and methods for compensating for latency in a touch screen controlled by a coupled processor, including maintaining historical data of delays in displaying a graphical response from the coupled processor after an input at the interactive touch screen, using the historical data to provide a graphical feedback signal at the interactive touch screen to reduce entry error by a user due to a delayed graphical response to the input, and displaying the graphical feedback on the interactive touch screen.

26 Claims, 6 Drawing Sheets

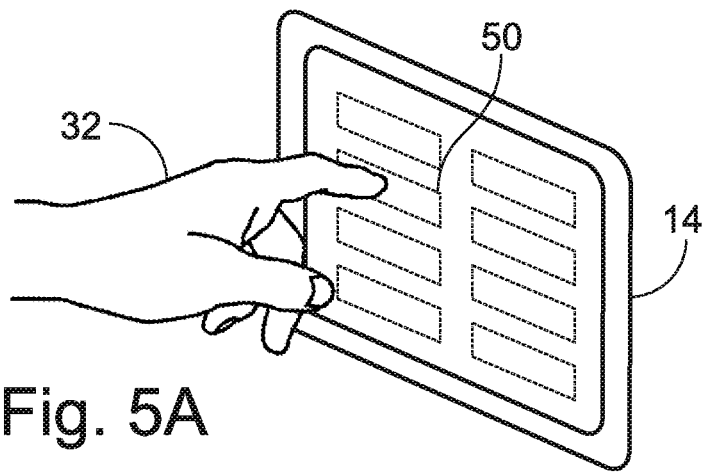
Fig. 5A — TOUCH INPUT
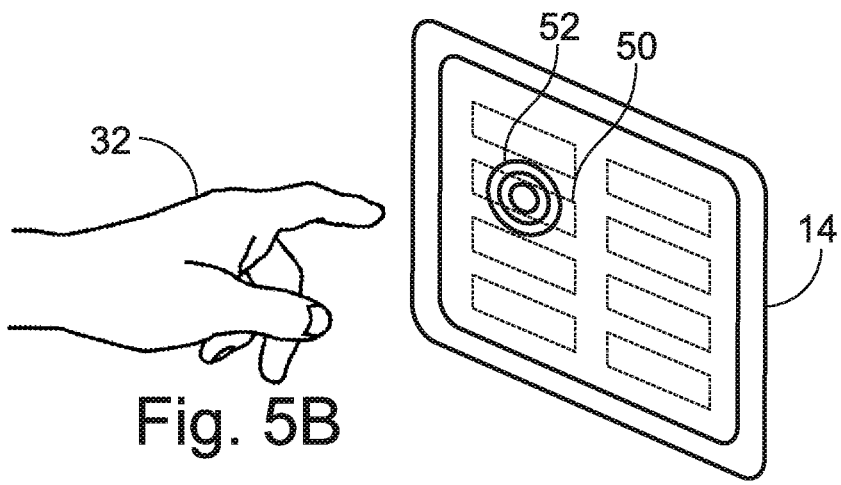
Fig. 5B — GRAPHIC FEEDBACK SIGNAL DISPLAYED
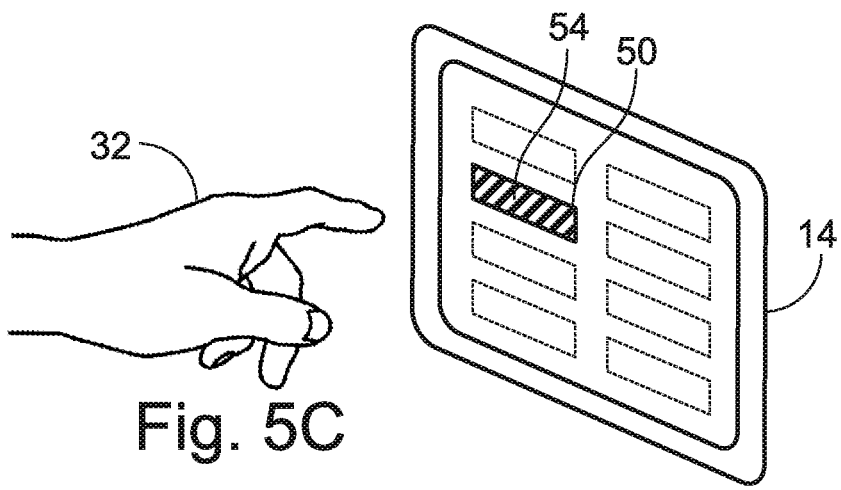
Fig. 5C — RESPONSE DISPLAYED

LATENCY COMPENSATION IN COUPLED PROCESSOR SYSTEMS

FIELD

This disclosure relates to touch screen devices used to operate a remote coupled processor, and more specifically to systems and methods for compensating for latency in displaying feedback from the remote coupled processor.

BACKGROUND

The ever-increasing use of Personal Digital Assistants (PDAs) and tablet computers has spurred the creation of an array of sometimes very specialized programs (or apps) for such platforms, intended to assist professional and/or technical personnel in carrying out their duties. Such apps may range from the simple to the highly complex. A land surveyor, for example, might be expected to have a topographical map database on their personal device, but might also use an app that provides a virtual theodolite.

Some occupations, however, may require that the professional be actively monitoring an existing system or instrument panel. In such cases, the use of a PDA to access a companion app, no matter how helpful the app may be, may compromise the ability of the professional to monitor those systems. For example, a commercial pilot may have a number of helpful apps on a handheld device, from a fuel consumption calculator to a database of airport diagrams, yet still not wish to divert their attention from the instrument panel of their aircraft.

One approach to this problem is to couple, or 'dock', the hand-held device to the computer system that is in use, so that a touch screen interface that is normally used by the professional can be used to control the coupled device. Unfortunately, this remote operation may result in increased latency, or lag, leading to operator irritation and even inaccurate operation, as in the absence of a response, a command may be entered at the touch screen multiple times.

What is needed is a system that is capable of coupling a touch screen to an associated device that provides active compensation for latency that may occur within the system.

SUMMARY

The present disclosure provides systems and methods for compensating for latency in the control of a processor controlled via a coupled touch screen.

In some aspects, the disclosure may provide methods for providing graphic feedback at an interactive touch screen controlling a coupled processor. The methods may include maintaining a predetermined period of historical data of a delay in displaying a graphical response from the coupled processor resulting from an input at the interactive touch screen; using the historical data, providing a graphical feedback signal at the interactive touch screen to reduce entry error by a user in response to receiving a delayed graphical response to the input; and displaying the graphical feedback using the interactive touch screen.

In some aspects, the disclosure may provide methods of latency compensation while operating a coupled processor using a local touch screen. The methods may include measuring a plurality of historical latency periods elapsing between user inputs on the local touch screen and display of corresponding responses displayed by the local touch screen from the coupled processor; determining an average latency period based upon the plurality of measured historical latency periods; in response to a first user input and during a first time interval corresponding to the determined average latency period after the first user input, generating a feedback signal configured to be detected by the user.

In some aspects, the disclosure may provide systems for latency compensation, where the systems may include a local processor; an interactive touch screen device that provides input to the local processor and receives output from the local processor via a local network; and an auxiliary processor that is operatively coupled to the local processor via a coupling network, where the local processor is configured to permit a user to remotely operate the auxiliary processor via the interactive touch screen device; measure a plurality of historical latency periods elapsing between user inputs on the interactive touch screen device and display of corresponding responses displayed by the interactive touch screen device from the auxiliary processor; determine an average latency period based upon the plurality of measured historical latency periods; and generate a feedback signal configured to be detected by the user in response to a first user input during the determined average latency period after the first user input.

The features, functions, and advantages may be achieved independently in various aspects of the present disclosure, or may be combined in yet other aspects further details of which can be seen with reference to the following description and drawings.

BRIEF DESCRIPTION OF THE DRAWINGS

FIG. 5A is a schematic depiction of a touch input at an interactive touch screen;

FIG. 5B depicts an exemplary generated graphic feedback signal displayed on the touch screen; and FIG. 5C depicts the touch screen's display of the actual response triggered by the initial touch input.

DESCRIPTION

The methods and systems of the present disclosure may reduce inadvertent errors during user operation of a remote coupled device via an interactive touch screen by displaying a graphic feedback signal at the touch screen in response to a touch input, and before receiving and/or displaying the response from the coupled device.

Various embodiments of the methods for providing graphic feedback and methods and systems of latency compensation are described below and illustrated in the associated drawings. Unless otherwise specified, the disclosed systems and methods may, but are not required to, contain at least one of the structure, components, functionality, and/or variations described, illustrated, and/or incorporated herein.

Furthermore, the structures, components, functionalities, and/or variations described, illustrated, and/or incorporated herein in connection with the present teachings may, but are not required to, be combined with and/or incorporated into other similar or related manufacturing processes. Although disclosed as useful in the context of aircraft operation, the systems and methods disclosed herein may have utility in any suitable application and appropriate environment, without limitation. The following description of various examples is merely exemplary in nature and is in no way intended to limit the disclosure, its application, or uses. Additionally, the advantages provided by the examples, as described below, are illustrative in nature and not all examples may provide the same advantages or the same degree of advantages.

Figure 1:
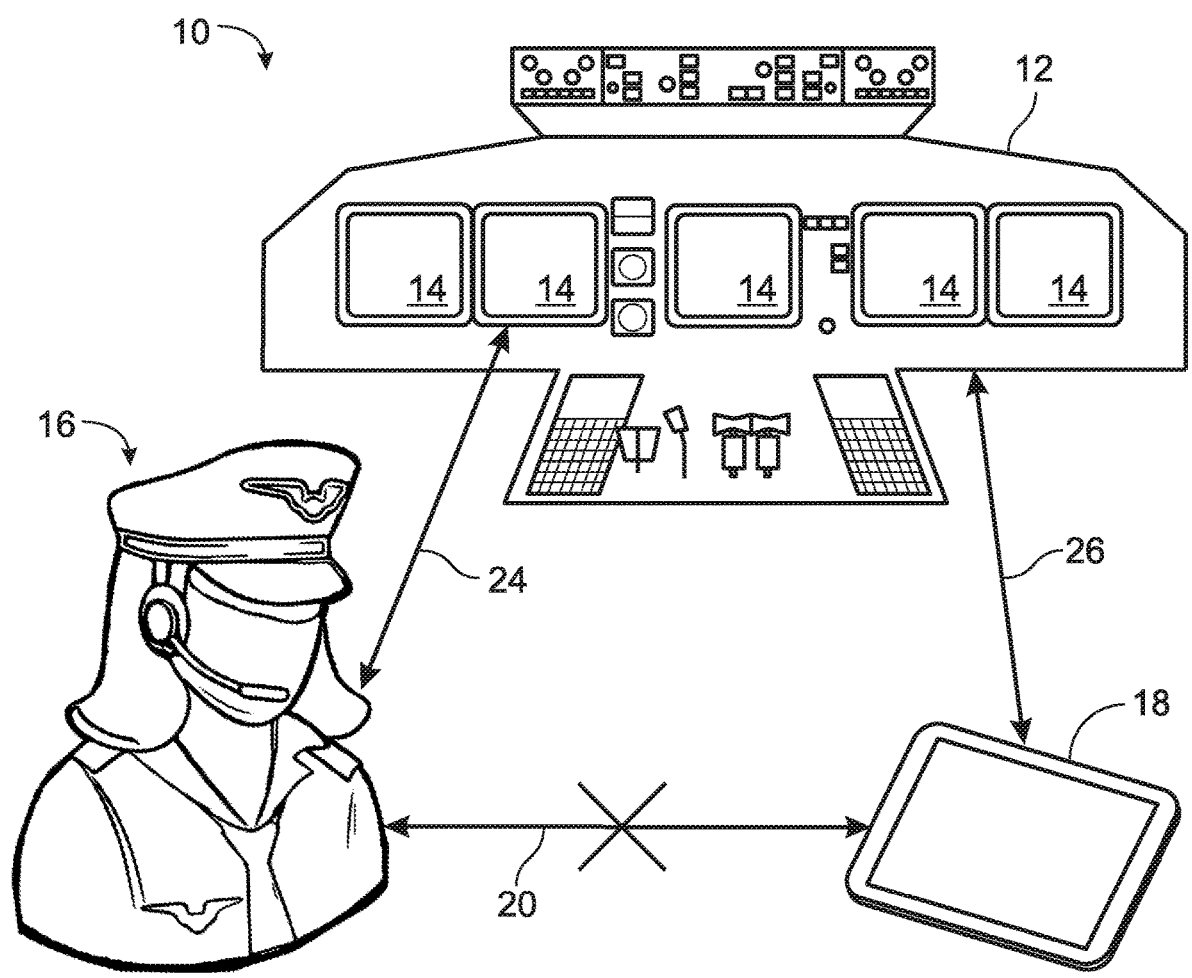
FIG. 1 is a schematic depiction of a pilot, an instrument panel including interactive touch screens, and a tablet coupled to the instrument panel via a central processor.

FIG. 1 schematically depicts an aircraft cockpit 10 as an illustrative example of an environment where the presently disclosed latency compensation systems and methods may be advantageous. As depicted, cockpit 10 includes an instrument panel 12, including several interactive touch screen interfaces 14 configured to display information and/or accept input from a member 16 of the flight crew during aircraft operation. Also shown is a representative personal digital device 18.

Flight crew member 16 may choose to access one or more applications residing on device 18. However, the direct operation of device 18 (represented by arrow 20) may be awkward, or even distracting, during operation of the aircraft. As the operation of device 18 might redirect the attention of flight crew member 16 away from instrument panel 12, it may be preferable in some circumstances to retain the attention of flight crew member 16 on instrument panel 12 whenever practical.

Device 18 may therefore be coupled via a central processor 22 (not shown) to an interactive touch screen 14 on instrument panel 12, so that flight crew member 16 can operate device 18 indirectly via input made via touch screen 14. As depicted in FIG. 1, by virtue of coupling device 18 to the central processor, flight crew member 16 may interact with touch screen 14 (as indicated by arrow 24) to control device 18 remotely (as indicated by arrow 26).

Although device 18 is depicted in FIG. 1 as a tablet computer, it should be appreciated that the depiction is exemplary in nature, and device 18 may include any of a variety of digital devices or systems. For example, device 18 may include a personal digital device, such as a portable telephone, a tablet, a notebook computer, a smart watch, and the like. Alternatively, device 18 may include an alternative processor or processors within the same aircraft, where the alternative processor is controlled via the touch screen 14. In yet another alternative aspect of the disclosure, the coupled device 18 may include a cloud hosted application or service, field-programmable gate array (FPGA), a partition of a central processor, or a human input from a virtual team member connected to the central processor 22 electronically.

As used herein, instrument panel 12, including touch screen 14 and central processor 22, may be components of an overall aircraft control system 28. For example, many modern aircraft may incorporate a "fly-by-wire" control system which replaces purely mechanical flight control with an electronic interface. When implementing a fly-by-wire control system, the movements of flight controls are converted to electronic signals transmitted via an electronic network to one or more flight control computers, which then determine how the actuators for each aircraft control surface should be moved to provide the desired effect on the flight of the aircraft. In a variation of fly-by-wire, the aircraft control system my utilize fiber optic cables in so-called fly-by-optics or fly-by-light avionics systems.

Figure 2:
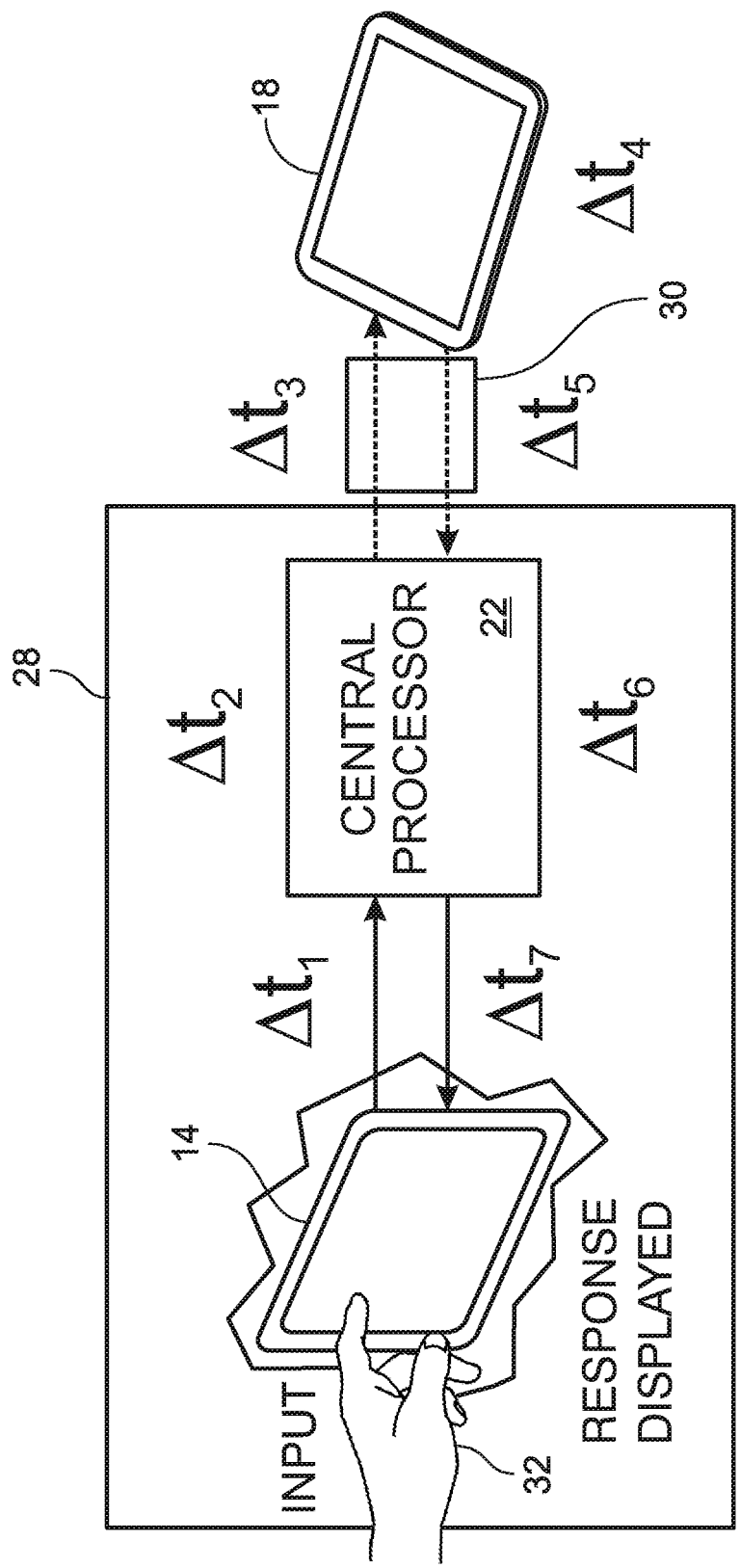
FIG. 2 is a schematic depiction of information flow from a user input at an interactive touch screen to a central processor, and on to a coupled device, and the device's response flowing to the central processor, to be displayed at the touch screen.

As shown in FIG. 2, central processor 22 may be a component of aircraft control system 28, which includes touch screen 14. Central processor 22 may be a processor responsible for interpretation of flight control movements and control surface actuation. Alternatively, central processor 22 may be a processor responsible for acting as a controller or input/output apparatus between instrument panel 12 and one or more additional processors of the aircraft control system 28.

By coupling device 18 to central processor 22, device 18 is networked with aircraft control system 28 via an appropriate interface 30, so that that central processor 22 is capable of mirroring an output of device 18 on touch screen 14, and that central processor 22 is also capable of relaying user inputs from touch screen 14 as commands to device 18. Put another way, once device 18 has been coupled to the aircraft control system 28 via interface 30, central processor 22 may be configured to emulate the operation of device 18 at touch screen 14.

In one aspect of the disclosure, the operation of device 18 may be mirrored at touch screen 14. That is, touch screen 14 may be configured to act as an emulation of device 18. It should be appreciated however touch screen 14 may be used to display any form of data received from device 18. For example, it may be possible that a remote application and associated display formats are hosted within the primary avionics software, and the coupled device 18 is accessed to retrieve numerical data that impacts the locally hosted application as it is displayed on touch screen 14. That is, a data request may be made at the coupled device for retrieval, and the resulting updated display may be generated within the primary avionics-hosted application.

Alternatively, or in addition, coupled device 18 may host one or more applications specifically designed for display on touch screen 14, and that may not be accessible via direct operation of the device itself; or an application of interest may be operating in the background on device 18 such that it does not render a native tablet display interface.

Device 18 may be coupled to aircraft control system 28 by any interface mechanism that may facilitate electronic communication and control between central processor 22 and device 18. Interface 30 may include a physical or mechanical connection between device 18 and aircraft control system 28 via, for example, a complementary docking port that creates a wired connection to the aircraft control system when device 18 is inserted into the docking port. Alternatively or in addition, interface 30 may include a data cable via a data port on device 18. The cable may be configured to be compliant with various standards such as Universal Serial Bus (USB), a High-Definition Multimedia Interface (HDMI), Digital Visual Interface (DVI), Ethernet, DisplayPort, Thunderbolt, and Lightning, among other types of standard and non-standard data interface standards. Alternative, or in addition, device 18 may be coupled to aircraft control system 28 by a wireless interface protocol such as Bluetooth, sub-GHz, Wi-Fi, zigbee, Z-Wave, and Thread, among others.

The operation of device 18 via touch screen 14 is depicted schematically in FIG. 2 as displaying an emulation or mirror of the display of device 18, or one or more examples of retrieved data or other aspect of operation of device 18 or remote application. A user 32 may view the display and create an input by touching the interactive touch screen 14. The input may then be transmitted to central processor 22, which then relays the input to device 18. The response from the application running on device 18 may then be transmitted to central processor 22, which in turn alters the image shown on touch screen 14 to reflect the response from device 18.

Unfortunately, as a result of operating device 18 remotely, there may be a noticeable delay between the time of the initial input at touch screen 14 and the time that the corresponding response is displayed at touch screen 14. This delay is referred to as network latency, and may be the result of cumulative individual delays as data is communicated over the networked system.

For example, as shown in FIG. 2, the total delay between initial input and resulting response may be calculated as the combination of a plurality of individual contributing delays. The time required to transmit the input signal from the touch screen 14 to central processor 22 is labeled as $\Delta t_1$, while the time required for the central processor to receive, interpret, and transmit the resulting signal to the device 18 is labeled as $\Delta t_2$. The bandwidth of coupling interface 30 may result in an additional delay $\Delta t_3$ to transmit the signal from central processor 22 to device 18, where delay $\Delta t_3$ may incorporate the effects of RF interference, network congestion, and other contributions to network delay. Depending on the capability of device 18, as well as the complexity of the calculation required to respond to the input at touchscreen 14, the time required to process the input within the coupled application and generate a response may require a time interval $\Delta t_4$. Similar to the communication delay $\Delta t_3$, transmitting the response from device 18 to central processor 22 may incur another communication delay $\Delta t_5$, while the time required for the central processor to receive, interpret, and transmit the resulting signal to the touch screen 14 is labeled as $\Delta t_6$ and $\Delta t_7$.

The total latency delay in the system depicted in FIG. 2 may therefore be calculated as a sum of individual delays:

$$\Delta t_{total} = \Delta t_1 + \Delta t_2 + \Delta t_3 + \Delta t_4 + \Delta t_5 + \Delta t_6 + \Delta t_7 \quad \text{Equation 1}$$

The latency due to communication and/or operations internal to the aircraft control system 28 can be calculated as $$\Delta t_{internal} = \Delta t_1 + \Delta t_2 + \Delta t_6 + \Delta t_7 \quad \text{Equation 2}$$

$\Delta t_{internal}$ may be a comparatively small contributor to total latency, as it corresponds to data that is transferred on wired connections and computations that occur on the relatively powerful central processor 22. However, $\Delta_{internal}$ is likely to be substantially stable, that is to say consistent over time, as well as invariant with respect to the nature of the coupled device 18. The contribution of $\Delta t_{internal}$ to total latency can therefore be measured initially and then considered to be a known value.

In contrast, the cumulative contribution of $\Delta t_3$, $\Delta t_4$, and $\Delta t_5$ may be greater than $\Delta t_{internal}$, but may also vary substantially depending on the nature of the coupled device 18. For example, an older personal device might employ older, slower data transfer protocols for communication with the central processor 22, thereby increasing the contribution of $\Delta t_3$ and $\Delta t_5$ to total latency. Alternatively or in addition, an older device may employ an older, slower processor, resulting in an additionally increased computational time contribution $\Delta t_4$.

The combination of each contribution to the latency of the system may result in frustration on the part of the user. For example, the user may enter a command via a graphical control on touch screen 14, and pause to see the expected response. Where the system exhibits substantial latency, the amount of time required to see a response from the coupled device may become irritating. Further, if the response does not appear when it is expected, the user may enter the same command via the graphical control again, perhaps several times, which may inadvertently enter the intended command several times, which may further delay the response from the coupled device 18, or may create an error condition, even further delaying the desired response from the coupled device.

Figure 3:
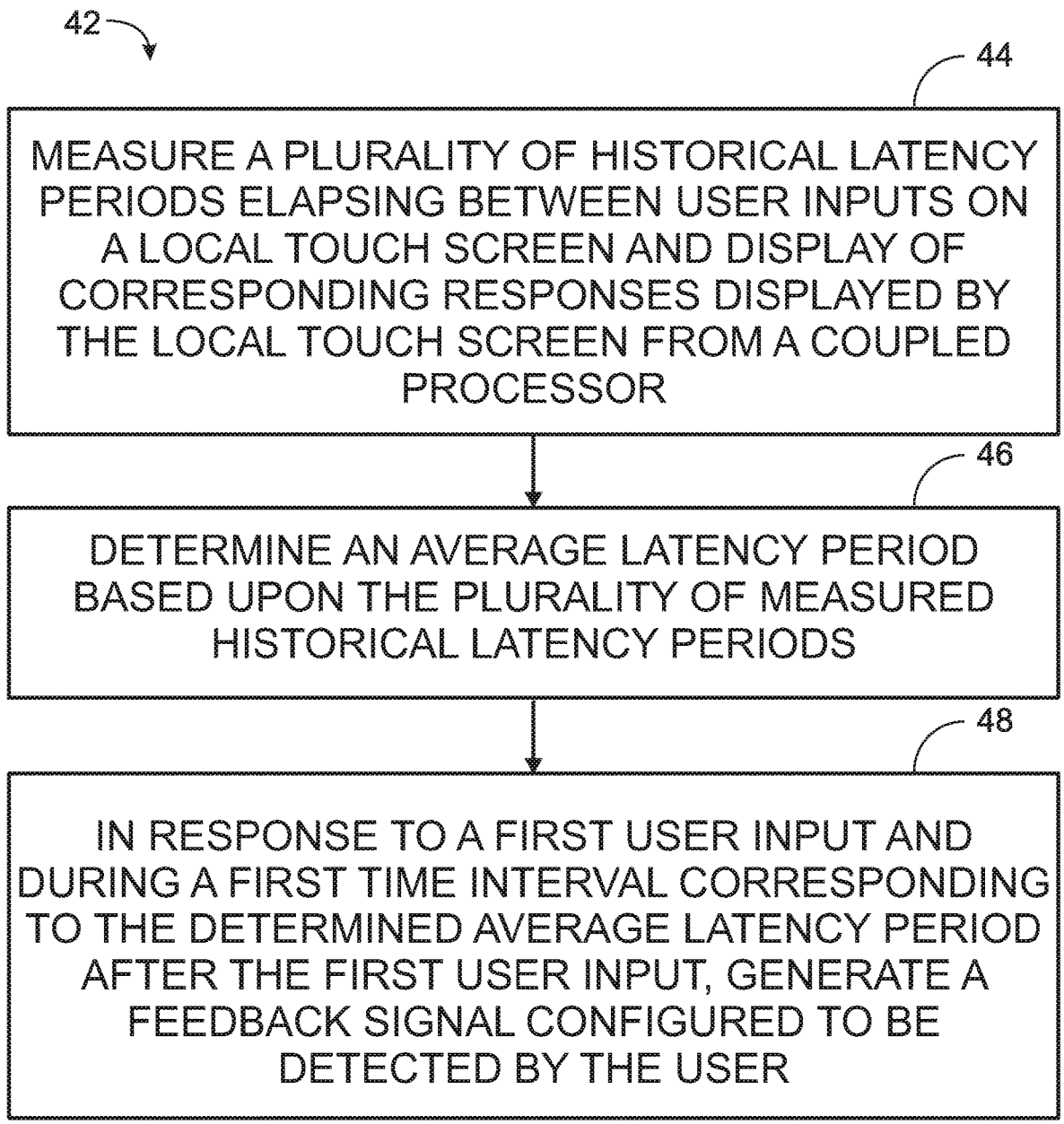
FIG. 3 is a flowchart illustrating a method for providing graphic feedback at an interactive touch screen controlling a coupled processor, according to an aspect of the present disclosure.

In one aspect of the present disclosure, in addition to facilitating the control of coupled processor 18 via touch screen 14, central processor 22 may be configured to concurrently execute a method for providing a graphic feedback signal at the interactive touch screen 14 that is controlling coupled processor 18, as set out at flowchart 34 of FIG. 3. More specifically, central processor 22 may be configured to maintaining a predetermined period of historical data of a delay in displaying a graphical response from the coupled processor resulting from an input at the interactive touch screen at 36 of flowchart 34; then using the historical data, providing a graphical feedback signal at the interactive touch screen to reduce entry error by a user due to the delay of the displayed graphical response to the input at 38 of flowchart 34; and displaying the graphical feedback signal using the interactive touch screen at 40 of flowchart 34.

Figure 4:
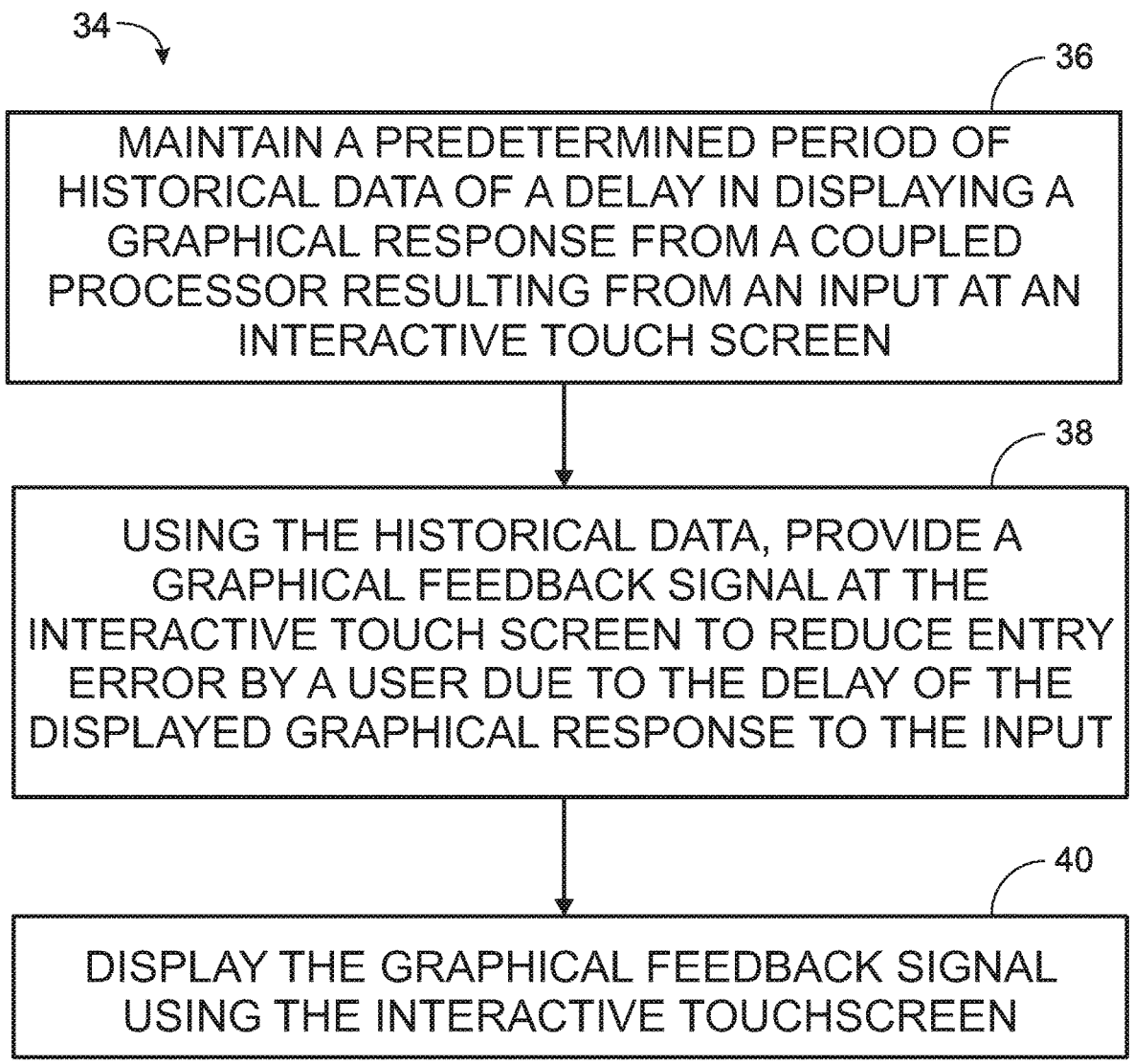
FIG. 4 is a flowchart illustrating a method for latency compensation while operating a coupled processor using a local touch screen, according to an aspect of the present disclosure.

An alternative method of the present disclosure is depicted in flowchart 42 of FIG. 4, in which a central processor may be configured to execute a method of latency compensation while operating a coupled processor using a local touch screen, including measuring a plurality of historical latency periods elapsing between user inputs on the local touch screen and display of corresponding responses displayed by the local touch screen from the coupled processor at 44 of flowchart 42; determining an average latency period based upon the plurality of measured historical latency periods at 46 of flowchart 42; and in response to a first user input and during a first time interval corresponding to the determined average latency period after the first user input, generating a feedback signal configured to be detected by the user at 48 of flowchart 42.

The methods of flowcharts 34 and 42 include collecting historical data relating to delays in the disclosed aircraft control system—coupled device network. That is, the latency of the relevant network must be measured and collected over time in order to be predictive of potential future latency. The latency of the network may be measured and collected for a predefined period of time, where the predefined period has been selected to provide sufficient historical data that an accurate forecast of future latency based on the historical data is meaningful. This historic network latency may be measured and collected in any manner that provides sufficiently accurate latency data.

Network latency may be determined by real-time monitoring. That is, the network packet corresponding to a touch input may be marked with a timestamp when it leaves the touch screen interface, and that timestamp may then be compared to the time the desired response is received. This value would correspond to round trip time, or RTT, and would generally correspond to $\Delta t_{total}$ of Equation 1. Alternatively, or in addition, the computation demands of measuring RTT for every data pack on the network may be minimized choosing a representative sample of packets to monitor over a given time period, although such sampling would require coordinating the choice of packets across the hardware components of the network. A more sophisticated method for measuring network latency may also be implemented, such as a Lossy Difference Aggregator (LDA).

As used herein, the delay interval that is recorded to determine historical latency in the disclosed aircraft control system—coupled device network may correspond to the time that elapses between after an input at touch screen 14 and the corresponding display of the graphical response at the touch screen. However, the delay interval may be measured in a number of ways. For example, the delay interval may be the absolute delay as measured from the input itself to the time the corresponding response is displayed. Alternatively, the delay interval may be a relative delay, corresponding to the time elapsing from a predicted response time until the graphical response is displayed. The predicted response time may be selected arbitrarily, may be based upon some calculated ideal response time, or may itself be based upon historical performance data collected from representative or benchmarked systems.

Regardless of the start point for the historical delay interval, the end point for the delay interval should correspond to the display, at touch screen 14, of the corresponding graphic response. As used herein, the corresponding graphic response is the display of, at the touch screen, the appropriate response that would be generated at the coupled device itself in response to the input given at the touch screen, as if the input were entered at the coupled device itself. That is, the corresponding graphic response reflects that mirroring of the graphical controls of coupled device 18 at touch screen.

Where coupled device 18 has been only recently coupled to aircraft control system 28, there may be no historical data for that device upon which to draw to calculate the delay interval. In this instance, the historical data may correspond to data collected from a previously coupled device, or a plurality of previously coupled devices. However, after delay data is collected from a plurality of operations of coupled device 18 via touch screen 14, the delay data specific for coupled device 18 and aircraft control system 28 may be utilized as the historical data for the purposes of the present methods.

Graphical Feedback Signal

The graphical feedback signal should be selected to convey to the user that their previous input was detected and transmitted to coupled device 18, but the expected corresponding graphic response has not yet been received. Therefore, the graphical feedback signal should be selected to be visually distinct from the expected and appropriate graphic response, so as not to mislead the user to mistake it for the expected corresponding graphic response. The graphical feedback signal should additionally be selected to incorporate an indication to the user that their input at the interactive touch screen has been directed to the processor of the coupled device 18. Alternatively, or in addition, the graphical feedback signal may be selected to incorporate an indication to the user that their input at the interactive touch screen was directed to a selected application running on the coupled processor.

In one aspect of the disclosed method, the generated graphical feedback signal may be a generic feedback signal, that is the same regardless of the type of input provided by the user. For example, the graphical feedback signal may correspond to a visual response that may occur at the location on touch screen 14 that the input occurred, indicating only that a touch was detected at that location, and that the input was transmitted to the coupled processor. By generating the feedback signal at the point of input, the feedback signal provides an immediate reassurance to the user that their previous input was recorded, and that a response will be forthcoming. For example, as shown in FIG. 5A, user 32 touches a control area 50 on touch screen 14, thereby inputting a command to coupled processor 18. After a delay interval based upon collected historical delay data, central processor generates a graphical feedback signal 52 on touch screen 14, as shown in FIG. 5B. Graphical feedback signal 52 may be any visual cue that clearly conveys that it is providing feedback on the user input and not a corresponding response. For example, feedback signal 52 of FIG. 5B is depicted as a three concentric circles centered upon the region of touch screen 14 contacted by user 32, in this case corresponding to control area 50. Feedback signal 52 may be a static image, or may incorporate animation, changing colors, or any other image effect to highlight signal 52 and differentiate it from the expected graphic response.

In FIG. 5C, a graphical response 54 from coupled device 18 that is the result of the initial input of FIG. 5A is displayed at touch screen 14. As shown, graphical response 54 is a simple highlighting of control area 50. It should be appreciated, however, that graphical response 54 may correspond to any appropriate image, display, operation or other action that would normally be displayed by the application being remotely operated at coupled device 18 after the input of user 32 at touch screen 14.

Adaptive Graphical Feedback

The generated graphical feedback signal may be varied so as to provide appropriate types of feedback to the user. Where the nature of the graphical feedback signal is varied in response to one or more of the input type, the application being controlled, and the predicted latency, among others, the feedback signal is considered to be an adaptive graphical feedback signal.

In one aspect of the disclosed methods, the graphical feedback signal may be selected to provide a correlation with the type of input entered by the user. For example, a feedback signal resulting from a touch input at touch screen 14 that closes a dialog box may be visually distinct from a feedback signal resulting from a touch input that is intended to initiate an operation by the associated application running on the coupled device 18.

In one aspect of the disclosed methods, the graphical feedback 54 from coupled device 18 displayed at touch screen 14 may be adaptive in response to the latency measured in the network. In particular, the specific nature of the graphical response 54 may be selected in response to the determined historical latency data.

In one embodiment, the systems and methods of the present disclosure may provide adaptive graphical feedback that is binary in nature. That is, where the measured latency of the aircraft control system—coupled device network is below a predetermined low threshold, central processor 22 may be configured so that graphical feedback signal is not displayed at touch screen 14, as the display of the corresponding response as relayed from the coupled device 18 occurs sufficiently quickly to avoid user frustration. Where the measured latency of the network is above the predetermined low threshold, central processor 22 may be configured to provide a graphical feedback signal at touch screen 14 intermediate the initial input and the display of the corresponding response.

In an alternative embodiment, the systems and methods of the present disclosure may provide variable graphical feedback in order to help convey the amount of latency being experienced in the network and system. In this embodiment, the particular nature of the feedback is at least somewhat dependent on the value of the measured historic latency of the network. As an illustrative example, several exemplary variable graphical feedback signals is shown in FIG. 6.

Figure 6:
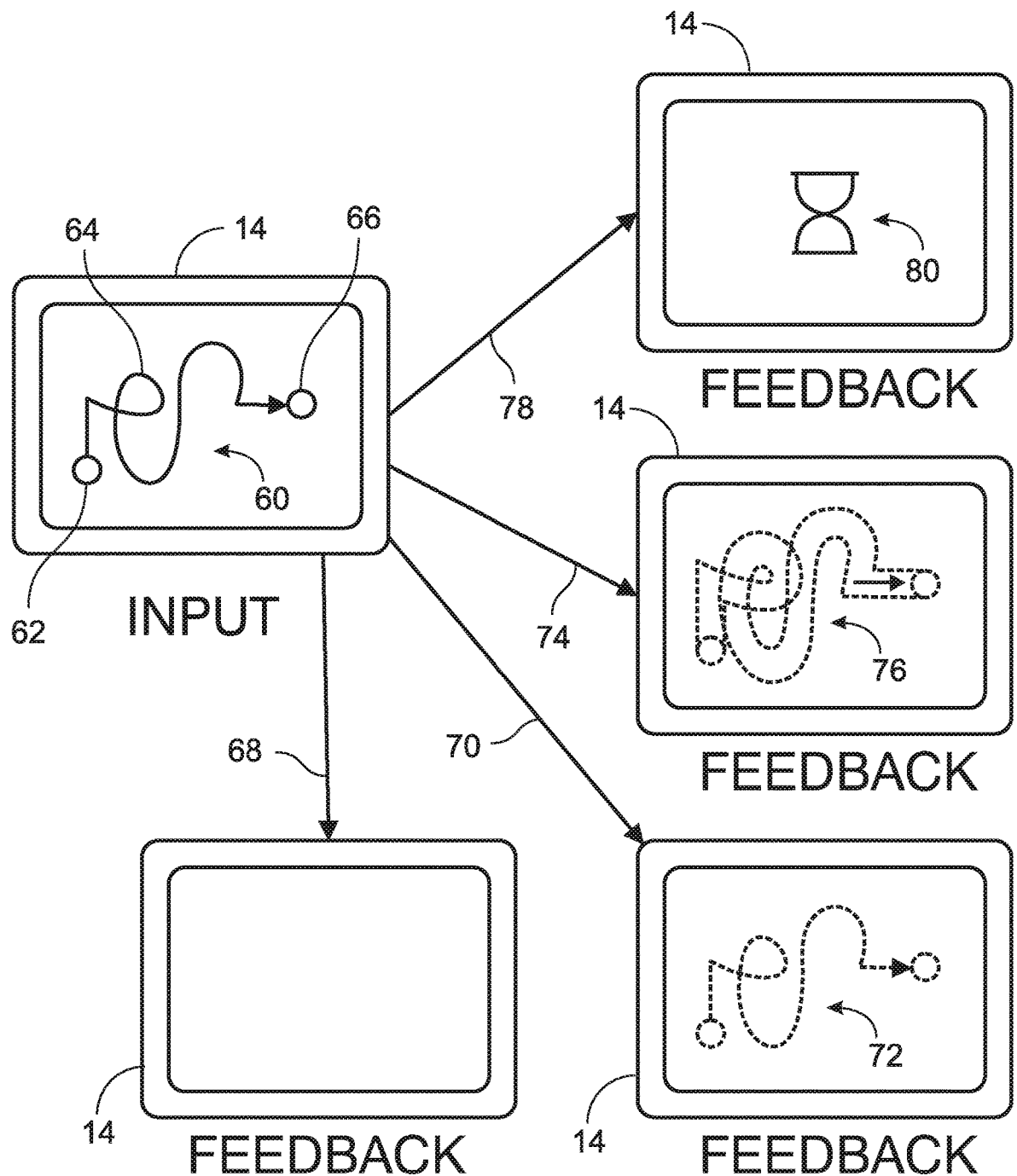
FIG. 6 is a schematic depiction of the generation of adaptive graphical feedback signals in response to changes in network latency.

As shown in FIG. 6, an initial input 60 is shown as a trace on touch screen 14, including an initial point 62 where the user's finger registers at the touch screen, a traced path 64 on the touch screen traced by the user's finger, and a terminal point 66 where the user's finger leaves the touch screen.

Where historical latency data predicts either no latency or extremely little latency (arrow 68), processor 22 may be configured to generate no intermediate graphic feedback signal on touch screen 14, as the corresponding response would be expected to be displayed promptly and graphic feedback would not be needed.

Where latency is present in the network, but is predicted by central processor 22 to be low (arrow 70), the central processor may generate a graphic feedback signal 72 that is closely reflective of the initial input 60. As illustrated in FIG. 6, the graphic feedback signal 72 closely echoes the shape of input 60 traced by the user, and signals to the user that their input was received, and that a delay may be experienced before the corresponding response is displayed.

Where the network is predicted to exhibit even greater latency (arrow 74), the increased delay may trigger the generation of a graphic feedback signal 76 that is non-distinct. That is, the visual signal is evocative of the initial trace 60, but simplified in such a way that the user is informed that their input was received, and that a greater delay may be experienced before the corresponding response is displayed.

Additionally, in those circumstances where the network is predicted to be exhibiting very high latency (arrow 78), the central processor may be configured to convey the existence of such high latency by displaying a graphic feedback signal 80 that is uncoupled from, or unrelated to, the nature of initial input 60, such as an hourglass or other distinctive image, which may be either a static or an animated image.

The timing and duration of the graphic feedback signal may be predetermined. That is, studies of user populations may provide an optimal delay before a graphic feedback signal is displayed, and/or an optimal duration for the graphic feedback signal to be displayed to maximize detection by a user.

Alternatively, or in addition, the graphic feedback signal may be made adaptive by manipulating the timing and duration of the display of the graphic feedback signal as a function of the amount of latency measured for the aircraft control system—coupled device network. In particular, the delay between detection of the user input and display of the graphic feedback signal should be short enough to avoid irritation due to a perceived nonresponsiveness. However, the duration of the display of the graphic feedback signal may be increased in those situations where historic latency data predicts a long delay before display of the corresponding response. In one aspect of the disclosed system and method, the feedback signal is displayed for a duration corresponding to the determined historical average latency period. Alternatively, the historical latency data is used to ensure that the graphic feedback signal is terminated prior to the predicted appearance of the corresponding response, so that the two are unlikely to be displayed simultaneously on touch screen 14.

The timing and appearance of a displayed graphic feedback signal may be selected independently of other prior or later touch inputs. That is, the graphic feedback signal may be displayed at an interval after the touch input that is determined only by the recorded latency history. Alternatively, or in addition, the precise timing and duration of multiple graphic feedback signals may be determined in coordination. For example, the displayed graphic feedback signal may be adaptively modified where the central processor 22 detects multiple initial inputs at touch screen 14 before the display of the feedback signal corresponding to the first input. For example, the originally calculated delay between a first input and the resulting first graphic feedback signal may be shortened in those cases where a second input occurs before generation of the first graphic feedback signal. The timing of additional feedback images may be similarly modified based upon the number of and timing of inputs at the touch screen.

In another aspect of the disclosed system and method, both the appearance and the timing and/or duration of the generated feedback signal may be modified to convey more complex information to the user. For example, where a second user input occurs after a first user input but prior to the display of the first feedback signal, the generated feedback signal to the first input may be modified to indicate that it is responsive to the first user input, and the generated feedback signal to the second input may be modified to indicate that it is responsive to the second user input. Any discernable and interpretable modification to the feedback signal may be used to indicate that it corresponds to a particular input, including changes in color, shape, and size, and animation, among others.

Apparatus and Software

The systems for carrying out the present methods of latency compensation, including but not limited to the control systems for selected aircraft, may include suitable data processing systems, which may further include a communications framework to provide communications between workstations, control systems, processor units, memory, persistent storage, communications units, input/output (I/O) units, and displays.

Instructions for an appropriate operating system, applications, and/or programs for carrying out the disclosed methods may be located in one or more storage devices in communication with the one or more processor units through the communications framework. The instructions may be in a functional form on a persistent storage. These instructions may be loaded into a memory for execution by a processor unit.

These instructions may be referred to as program instructions, program code, computer usable program code, or computer readable program code that may be read and executed by a processor. The program code in the different embodiments may be embodied on different physical or computer-readable media.

Any combination of computer-readable media may be utilized. Computer-readable media can be a computer-readable signal medium and/or a computer-readable storage medium. A computer-readable storage medium may include an electronic, magnetic, optical, electromagnetic, infrared, and/or semiconductor system, apparatus, or device, or any suitable combination of these. More specific examples of a computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, and/or any suitable combination of these and/or the like. In the context of this disclosure, a computer-readable storage medium may include any suitable tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, and/or any suitable combination thereof. A computer-readable signal medium may include any computer-readable medium that is not a computer-readable storage medium and that is capable of communicating, propagating, or transporting a program for use by or in connection with an instruction execution system, apparatus, or device.

Program code embodied on a computer-readable medium may be transmitted using any appropriate medium, including but not limited to wireless, wireline, optical fiber cable, RF, and/or the like, and/or any suitable combination of these.

Computer program code for carrying out operations for aspects of the present disclosure may be written in one or any combination of programming languages, including an object-oriented programming language such as Java, Smalltalk, C++, and/or the like, and conventional procedural programming languages, such as the C programming language. The program code may execute entirely on a central processor, partly on a central processor and partly on one or more additional processors, or entirely on a remote computer or server. In the latter scenario, the remote computer may be connected to the central processor through any type of network, including a local area network (LAN) or a wide area network (WAN), and/or the connection may be made to an external computer (for example, through the Internet using an Internet Service Provider).

The computer program code or instructions can also be loaded onto a computer, other programmable data processing apparatus, and/or other device to cause a series of operational steps to be performed on the device to produce a computer-implemented process such that the instructions which execute on the computer or other programmable apparatus provide processes for implementing the functions/acts specified in the present disclosure, for example as embodied by flowcharts and/or block diagram block or blocks.

Examples, Alternatives, and Preferred Embodiments

This section describes additional aspects and features of the systems and methods of the present disclosure, presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A1. A method for providing graphic feedback at an interactive touch screen controlling a coupled processor, comprising:

maintaining a predetermined period of historical data of a delay in displaying a graphical response from the coupled processor resulting from an input at the interactive touch screen;

using the historical data, providing a graphical feedback signal at the interactive touch screen to reduce entry error by a user due to the delay of the displayed graphical response to the input; and displaying the graphical feedback signal using the interactive touch screen.

A2. The method of paragraph A1, wherein the graphical feedback signal is configured to reduce repeated user input at the interactive touch screen.

A3. The method of paragraph A1, wherein the graphical feedback signal is displayed during a time interval between the input to the interactive touch screen and the display of a response from the coupled processor.

A4. The method of paragraph A1, wherein the historical data includes a plurality of recorded latency intervals measured between an input at the interactive touch screen and a display of a response at the interactive touch screen from the coupled processor; the method further comprising calculating a projected latency interval based upon the historical data, and displaying the graphical feedback signal includes displaying the graphical feedback signal during a time period beginning with the input at the interactive touch screen and corresponding to the calculated projected latency interval.

A5. The method of paragraph A1, wherein the graphical feedback signal incorporates an indication to the user that the input at the interactive touch screen was directed to the coupled processor.

A6. The method of paragraph A5, wherein the graphical feedback signal incorporates an indication to the user that input at the interactive touch screen was directed to a selected application running on the coupled processor.

B1. A method of latency compensation while operating a coupled processor using a local touch screen, comprising:

measuring a plurality of historical latency periods elapsing between user inputs on the local touch screen and display of corresponding responses displayed by the local touch screen from the coupled processor;

determining an average latency period based upon the plurality of measured historical latency periods;

in response to a first user input and during a first time interval corresponding to the determined average latency period after the first user input, generating a feedback signal configured to be detected by the user.

B2. The method of paragraph B1, wherein generating the feedback signal includes generating a graphical feedback signal displayed on the local touch screen.

B3. The method of paragraph B1, wherein generating the feedback signal includes generating the feedback signal during the first time interval as measured from the first user input.

B4. The method of paragraph B1, wherein generating the feedback signal includes generating a generic feedback signal regardless of a first user input type.

B5. The method of paragraph B1, wherein generating the feedback signal includes generating a specific feedback signal correlated with a first user input type.

B6. The method of paragraph B1, wherein generating the feedback signal includes generating a graphical reproduction of the first user input on the local touch screen.

B7. The method of paragraph B1, wherein generating the feedback signal includes generating a feedback signal for a duration of the time interval corresponding to the determined average latency period.

B8. The method of paragraph B1, wherein a second user input occurs after the first user input and before the feedback signal is generated, further comprising generating a first feedback signal indicative of the first user input and generating a second feedback signal indicative of the second user input.

B9. The method of paragraph B8, wherein a timing and/or duration of the first and second feedback signals is generated in coordination.

B10 The method of paragraph B8, wherein generating the first feedback signal and the second feedback signal includes generating the first feedback signal and the second feedback signal so that they are discernable from each other.

C1. A system for latency compensation, comprising:
  a local processor;
  an interactive touch screen device that provides input to the local processor and receives output from the local processor via a local network; and
  an auxiliary processor that is operatively coupled to the local processor via a coupling network;
  wherein the local processor is configured to:
  permit a user to remotely operate the auxiliary processor via the interactive touch screen device;
  measure a plurality of historical latency periods elapsing between user inputs on the interactive touch screen device and display of corresponding responses displayed by the interactive touch screen device from the auxiliary processor;
  determine an average latency period based upon the plurality of measured historical latency periods; and
  generate a feedback signal configured to be detected by the user in response to a first user input during the determined average latency period after the first user input.

C2. The system of paragraph C1, wherein the local processor and interactive touch screen device are present on a vehicle.

C3. The system of paragraph C1, wherein the local processor and interactive touch screen device are integrated in a control system of an aircraft.

C4. The system of paragraph C1, wherein the auxiliary processor is present in a portable electronic device.

C5. The system of paragraph C4, wherein the portable electronic device is a laptop computer, a tablet, or personal digital assistant.

C6. The system of paragraph C4, wherein the local network includes a wireless data network.

C7. The system of paragraph C4, wherein the local processor is configured to mirror an operation of the portable electronic device on the interactive touch screen device.

C8. The system of paragraph C1, wherein the feedback signal is a graphical feedback signal displayed on the interactive touch screen device before an expiration of the average latency period.

C9. The system of paragraph C8, wherein the feedback signal is a graphical feedback signal displayed on the interactive touch screen device until a display of the response to the first user input.

C10. The system of paragraph C1, wherein the feedback signal includes a graphical reproduction of the first user input on the interactive touch screen device.

ADVANTAGES, FEATURES, BENEFITS

The presently disclosed systems and methods address the existing drawbacks of interactive touchscreen systems where user satisfaction declines as system latency increases. Similarly, the disclosed systems and methods address the associated increase in input error rates due to increased system latency in touch screen systems. Errors are reduced by displaying graphic feedback that is coupled to the actual latency observed in the relevant system in real time, and the graphic feedback is coupled to the observed latency so that it may adapt by changing the timing, appearance, and/or visibility of the feedback signal. This may result in reduced user input error rates and improved satisfaction with system response.

Although the disclosed systems and methods are highly applicable to any environment where a coupled device is controlled via a networked touch screen input, they may be particularly useful for operating a coupled device while operating a vehicle—such as a car, truck, train, aircraft, and the like—where a potential distraction from the vehicle controls may have undesirable results.

CONCLUSION

Although the systems and methods of the present disclosure have been shown and described in the context of aircraft control systems, it should be apparent to those of skill in the art that the foregoing operational principles and preferred embodiments are applicable to a variety of vehicle operating systems, as well as any other situation where coupled devices may be remotely operated. Various changes to the disclosed systems and methods in form and detail may be made without departing from the spirit and scope of the disclosure, which is intended to embrace all such alternatives, modifications and variances that fall within the scope of the appended claims.

The disclosure set forth above may encompass multiple distinct inventions with independent utility. Although each of these inventions has been disclosed in its preferred form(s), the specific examples thereof as disclosed and illustrated herein are not to be considered in a limiting sense, because numerous variations are possible. The subject matter of the inventions includes all novel and nonobvious combinations and subcombinations of the various elements, features, functions, and/or properties disclosed herein. The following claims particularly point out certain combinations and subcombinations regarded as novel and nonobvious. Inventions embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the present disclosure.

What is claimed is:

1. A method that reduces entry error by a user due to a delay of a displayed graphical response to an input at an interactive touch screen providing input to a local processor that is operatively coupled to an auxiliary processor in a portable electronic device via a coupling network, comprising:
  maintaining by the local processor a predetermined period of historical data of a delay in displaying a graphical response from the coupled auxiliary processor resulting from an input at the interactive touch screen, wherein the delay is measured from the input itself to when the corresponding graphical response is displayed at the interactive touch screen;
  receiving at the interactive touch screen an initial input;
  using the historical data, calculating by the local processor a projected delay in displaying the graphical response from the coupled auxiliary processor to the initial input at the interactive touch screen;
  selecting by the local processor an adaptive graphical input feedback signal from at least three graphical input feedback signal types for display at the interactive touch screen; wherein the at least three graphical input feedback signal types correspond to indications of at least three different ranges for a length of the calculated projected delay, and the selected adaptive graphical input feedback signal is selected at least in part to convey to the user an indication of the length of the calculated projected delay; and displaying by the local processor the selected adaptive graphical input feedback signal at a location of the initial input using the interactive touch screen.

2. The method of claim 1, wherein the selected adaptive graphical input feedback signal is configured to reduce repeated user input at the interactive touch screen.

3. The method of claim 1, wherein the selected adaptive graphical input feedback signal is displayed during a time interval between the initial input to the interactive touch screen and the display of the graphical response from the coupled auxiliary processor.

4. The method of claim 1,
the method further comprising displaying the adaptive graphical input feedback signal during a time period beginning with the initial input at the interactive touch screen and corresponding to the calculated projected delay.

5. The method of claim 1, wherein the selected adaptive graphical input feedback signal incorporates an indication to the user that the initial input at the interactive touch screen was directed to the coupled auxiliary processor.

6. The method of claim 5, wherein the selected adaptive graphical input feedback signal incorporates an indication to the user that the initial input at the interactive touch screen was directed to a selected application running on the coupled auxiliary processor.

7. A method that facilitates latency compensation while operating a coupled processor, via a coupling network, using a local touch screen, comprising:
measuring a plurality of historical latency periods elapsing between user inputs on the local touch screen and display of corresponding responses displayed by the local touch screen from the coupled processor, wherein the historical latency periods are measured from the user input itself to when the corresponding graphical response is displayed at the local touch screen;
determining an average latency period based upon the plurality of measured historical latency periods;
in response to a first user input and during a first time interval corresponding to the determined average latency period after the first user input, selecting one of at least three adaptive graphical input feedback signals to be displayed on the local touch screen, wherein the at least three adaptive graphical input feedback signals correspond to indications of at least three different ranges for a length of the determined average latency period;
wherein the adaptive graphical input feedback signal is selected to convey an indication of the length of the determined average latency period to the user; and
displaying by the local touch screen the selected adaptive graphical input feedback signal at a location of the first user input using the local touch screen.

8. The method of claim 7, wherein generating the adaptive graphical input feedback signal includes generating the adaptive graphical input feedback signal during the first time interval as measured from the first user input.

9. The method of claim 7, wherein generating the adaptive graphical input feedback signal includes generating a specific feedback signal correlated with a first user input type.

10. The method of claim 7, wherein generating the adaptive graphical input feedback signal includes generating a graphical reproduction of the first user input on the local touch screen.

11. The method of claim 7, wherein generating the adaptive graphical input feedback signal includes generating a feedback signal for a duration of the first time interval corresponding to the determined average latency period.

12. The method of claim 7, wherein a second user input occurs after the first user input and before the adaptive graphical input feedback signal is generated, further comprising generating a first adaptive graphical input feedback signal indicative of the first user input and generating a second adaptive graphical input feedback signal indicative of the second user input.

13. The method of claim 12, wherein at least one of a timing or duration of the first and second adaptive graphical input feedback signals is generated in coordination.

14. The method of claim 12, wherein generating the first adaptive graphical input feedback signal and the second adaptive graphical input feedback signal includes generating the first adaptive graphical input feedback signal and the second adaptive graphical input feedback signal so that they are discernable from each other.

15. A system that facilitates latency compensation, comprising:
a local processor;
an interactive touch screen device that provides input to the local processor and receives output from the local processor via a local network; and
an auxiliary processor that is operatively coupled to the local processor via a coupling network;
wherein the local processor is configured to:
permit a user to remotely operate the auxiliary processor via the interactive touch screen device;
measure a plurality of historical latency periods elapsing between a user input on the interactive touch screen device and display of a corresponding response displayed by the interactive touch screen device from the auxiliary processor, wherein the historical latency periods are measured from the user input itself to when the corresponding graphical response is displayed at the interactive touch screen;
determine an average latency period based upon the plurality of measured historical latency periods;
select an adaptive graphical input feedback signal from at least three graphical input feedback signal types, based at least in part upon the determined average latency period such that the at least three graphical input feedback signal types correspond to indications of at least three different ranges for a length of the determined average latency period;
generate on the interactive touch screen device the selected adaptive graphical input feedback signal in response to a first user input, the adaptive graphical input feedback signal being configured to be detected by the user during a time period measured from the first user input, and to convey to the user an indication of a length of the determined average latency period.

16. The system of claim 15, wherein the local processor and interactive touch screen device are present on a vehicle.

17. The system of claim 15, wherein the local processor and interactive touch screen device are integrated in a control system of an aircraft.

18. The system of claim 15, wherein the auxiliary processor is present in a portable electronic device.

19. The system of claim 18, wherein the portable electronic device is a laptop computer, a tablet, or personal digital assistant.

20. The system of claim 18, wherein the local network includes a wireless data network.

21. The system of claim 18, wherein the local processor is configured to mirror an operation of the portable electronic device on the interactive touch screen device.

22. The system of claim 15, wherein the adaptive graphical input feedback signal is displayed on the interactive touch screen device before an expiration of the determined average latency period.

23. The system of claim 22, wherein the adaptive graphical input feedback signal is displayed on the interactive touch screen device until a display of the response to the first user input.

24. The system of claim 15, wherein the adaptive graphical input feedback signal includes a graphical reproduction of the first user input on the interactive touch screen device.

25. The system of claim 15, wherein the local processor is configured to generate the selected adaptive graphical input feedback signal, and the selected adaptive graphical input feedback signal incorporates an indication to the user that the first user input at the interactive touch screen device was directed to the auxiliary processor.

26. The system of claim 25, wherein the local processor is configured to generate the selected adaptive graphical input feedback signal, wherein the selected adaptive graphical input feedback signal incorporates an indication to the user that the first user input at the interactive touch screen device was directed to a selected application running on the auxiliary processor.

* * * * *